(12) United States Patent
Das et al.

(10) Patent No.: US 8,693,583 B2
(45) Date of Patent: Apr. 8, 2014

(54) METHOD AND APPARATUS FOR DECODING A REPEATED MESSAGE

(75) Inventors: Sajal Kumar Das, Bangalore (IN); Miguel M. Lopez, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 276 days.

(21) Appl. No.: 13/297,998

(22) Filed: Nov. 16, 2011

(65) Prior Publication Data

US 2013/0064331 A1 Mar. 14, 2013

(30) Foreign Application Priority Data

Sep. 9, 2011 (IN) .......................... 2628/DEL/2011

(51) Int. Cl.
*H04L 27/06* (2006.01)
(52) U.S. Cl.
USPC .......................................... 375/340; 714/780
(58) Field of Classification Search
USPC ................... 375/340, 316; 370/216; 714/780
See application file for complete search history.

(56) References Cited

U.S. PATENT DOCUMENTS

| 6,553,065 | B1 * | 4/2003 | Tuutijarvi | 375/224 |
| 2001/0020287 | A1 * | 9/2001 | Yano et al. | 714/780 |
| 2002/0062468 | A1 * | 5/2002 | Nagase et al. | 714/755 |
| 2005/0086570 | A1 * | 4/2005 | Ariyoshi | 714/755 |
| 2008/0279312 | A1 * | 11/2008 | Stewart et al. | 375/340 |
| 2009/0239585 | A1 * | 9/2009 | Huss | 455/561 |
| 2010/0008330 | A1 * | 1/2010 | Zeng et al. | 370/333 |
| 2010/0278036 | A1 * | 11/2010 | Dai et al. | 370/216 |
| 2011/0143805 | A1 * | 6/2011 | Ramasamy et al. | 455/522 |

FOREIGN PATENT DOCUMENTS

| EP | 1605624 A1 | 12/2005 |
| EP | 1724959 A1 | 11/2006 |

OTHER PUBLICATIONS

Woo, G., et al., "Beyond the Bits: Cooperative Packed Recovery Using Physical Layer Information", MobiCom '07, Sep. 9, 2007, pp. 1-12, Montreal, Quebec, Canada, XP55035291.
3rd Generation Partnership Project, "Radio Subsystem Link Control," 3GPP TS 45.008 v6.11.0; Technical Specification Group GSM/EDGE Radio Access Network; Release 6, section 4.2, Jan. 2005.
3rd Generation Partnership Project, "Radio Transmission and Reception," 3GPP 45.005 v 6.8.0; Technical Specification Group GSM/EDGE Radio Access Network; Release 6, section 6.2, Jan. 2005.

(Continued)

*Primary Examiner* — Aristocratis Fotakis
(74) *Attorney, Agent, or Firm* — Coats and Bennett, P.L.L.C.

(57) ABSTRACT

Techniques for decoding repeated messages sent from a transmitter are improved with information obtained from the decoding of the first transmission and by augmenting Chase combining techniques with a voting-based combining method. In an example method, first encoded bits corresponding to a first instance of the repeated message and demodulated to obtain first soft bits, which are decoded to obtain first decoded bits. Second encoded bits corresponding to a second instance of the repeated message are demodulated to obtain second soft bits. The first decoded bits are re-encoded to obtain re-encoded bits. Sign values for modified soft bits are determined from sign values for the first soft bits, the sign values for the second soft bits, and the sign values for the re-encoded bits. The modified soft bits are combined with the first soft bits and decoded.

25 Claims, 9 Drawing Sheets

(56) References Cited

OTHER PUBLICATIONS

Bauch et al., "Iterative Equalization and Decoding for the GSM System," Vehicular Technology Conference VTC 98, vol. 3, pp. 2262-2266, 1998.

Dong et al., "Optimal Design and Placement of Pilot Symbols for Channel Estimation," School of Electrical Engineering, Cornell University, Ithaca, NY, Dec. 2002.

Savazzi et al., "Training Structure Design Optimization for Continuous Time-Varying Fading Channels," Dip. di Elettronica e Informazione, Politecnico di Milano, Milano, Italy, Apr. 3, 2008.

* cited by examiner (1) First time transmitted block's reception:
//call Equalizer for channel estimation and softbit generation
//store softbits- S1 or softbit[116*4]
//call de-interleaver and decoder
//call interleaver and encoder, add stealing bits
//convert the hardbit to NRZ sequence and store the values - H1[i] or decodedbits [116*4]

(2) Repeated block's reception:
//call Equalizer for channel estimation and softbit generation for repeated block
//modify the sign value and confidence value of the repeated blocks softbits according to the algorithm

```
static int number=0;

if(number / 4 ==1)// it's repeated blk,
{
  int n=number%4;
//equParamBlk.pBurstSoftBits[i] is the 2nd time decoded soft value from the demod/equ
//this needs to be modified according to the algorithm as below
  for(int ii=0;ii<116;ii++)
  {
          int pos=0,neg=0;//count the total number of +ve and -ve sign in three options
            of softbits
            if(decodedsoftbits[ii]>0)pos++;
            else neg++;
            if(softbit[n*116+ii]>0)pos++;
            else neg++;
            if(equParamBlk.pBurstSoftBits[ii]>0)pos++;
            else neg++;
                 //if all three are of same sign then give high confidence
            if(pos==3)equParamBlk.pBurstSoftBits[ii]=+1.0;
            if(neg==3)equParamBlk.pBurstSoftBits[ii]=-1.0;
            if(pos==2)
             {
                if(softbit[n*116+ii]>0)
                   equParamBlk.pBurstSoftBits[ii]=softbit[n*116+ii];//assign to repeated
                   soft bit
                   //else S2 will be assigned as default value to same as S2
             }
             if(neg==2)
             {
                if(softbit[n*116+ii]<0)
                   equParamBlk.pBurstSoftBits[ii]=softbit[n*116+ii];//assign to repeated
                   soft bit
                   //else S2 will be assigned as default value to same as S2
             }
   }
   number++;
   index = 116*number;
}
```
//then call softbit combiner

*FIG. 10*

METHOD AND APPARATUS FOR DECODING A REPEATED MESSAGE

RELATED APPLICATION

This application claims priority to India provisional Patent Application Ser. No. 2628/DEL/2011, filed Sep. 9, 2011.

TECHNICAL FIELD

The present invention relates generally to the decoding of control messages in a communication system, and more particularly relates to techniques for improving decoding performance when decoding repeated messages transmitted in a wireless communication system.

BACKGROUND

Error-free transmission of information over a communication link, and in particular over a wireless communication channel, remains a fundamental challenge for communications engineers. Various techniques have been employed in the physical layer to make the communications link more robust, such as advanced modulation schemes, channel coding, and the like. Likewise, error checking and error correction techniques have been deployed in the data link layer to improve the link's reliability. However, the reliability of the communication channel remains important because of the continuing demand for more mobility and improved reliability, coupled with seamless handovers and higher data rates.

Various methods such as Automatic Repeat Request (ARQ), code combining, incremental redundancy, and Chase combining are commonly employed to reduce a link's bit-error rate (BER) and frame-error rate (FER). However, each of these techniques has both advantages and disadvantages and some are not so effective under demanding conditions.

For example, conventional error correcting codes are most effective when the errors are randomly distributed throughout the bit stream, but are less effective when a stream of bits includes several errors grouped closely together. For this reason, an interleaving procedure is used in many wireless systems, to exploit time diversity and reduce errors in transmission by distributing the errors across several separately encoded groups of bits so that error correcting codes are more effective. For instance, in GSM systems for SACCH control channel transmission, the SACCH bursts occur once every 26 bursts or after a time separation of 26*TDMA frame duration=26*4.615 mSec =120 mSec. (See 3GPP TS05.03, §4.14.) Each SACCH block's data (before encoding 184 bits, and after encoding 456 bits) is divided, with an interleaver, into four SACCH bursts for transmission. So, consecutive bits are time separated by (4*26*4.615) =480 mSec.–this clearly offers time diversity. But, this is still not enough to assure error-free transmission.

The ability of an interleaving process to improve the performance of an error-correcting code is directly related to the "coherence time" of the transmission channel. A coherence time of Tc for a given channel indicates that if two frames are transmitted at an interval of Tc, then there is a good probability that the channel has changed in the meantime (e.g., channel state has been changed from good to bad or vice versa), so that the frames experience different channel states.

The coherence time of a wireless channel depends, among other things, on the relative movement between the transmitter and the receiver, which is often represented as:

$$T_c = \frac{1}{4D_s}, \quad (1)$$

where $D_s$ is the Doppler spread induced by movement of a mobile station relative to the base station. Since $D_s=2fv/c$, where f is the transmission frequency, v is the relative speed between the transmitter and receiver, and c is the speed of light, a typical coherence time for a GSM channel might be:

$$T_c=c/(8fv)\approx 3*10^8/(8*900*10^6*(30*10^3/3600))\approx 5 \text{ ms}, \quad (2)$$

given a center frequency of 900 MHz and a relative movement between transmitter and receiver at 30 kilometers per hour. This implies that if a channel is in deep fade at a given time, then after a 5 ms time interval there is significant probability that the same channel will not be in the same fading state. So, if the same data is sent twice with a time gap between transmissions of more than 5 ms, then it is unlikely that both transmissions will suffer the same fading effect. Thus, at least one of the transmissions might experience relatively good channel conditions.

In many systems, this time-diversity approach is exploited through use of a Chase combining technique to improve the signal quality of certain. Received information corresponding to an erroneously received block is kept and combined with information corresponding to the retransmission of the block. With this algorithm, decoding performance is improved because the two blocks carry the same information but are corrupted differently by the channel.

In GSM systems, the Slow Associated Control Channel (SACCH) and the Fast Associated Control Channel (FACCH) carry important system information and require some extra amount of protection in order keep the wireless link active and robust. Reliability of these control channels is particularly important because call-drop and handover issues most often arise because of poor signal reception in an area of weak wireless signal coverage area or because of short-term fading effects, either of which can cause control channel decoding to fail. The effect of these short duration channel corruptions is not quite as severe for voice signals, since traffic channel decoding errors often result in a situation where no speech is heard for a short time but resumes when the channel improves. If control channel decoding remains reliable, the link can usually be maintained through short-term impairments.

As a result, it is very useful to have even small performance gains for decoding of SACCH or FACCH logical channels. To provide some extra protection for these control channels against temporary severe channel degradations, 3GPP has introduced a feature called Downlink Repeated FACCH and Repeated SACCH. The Repeated SACCH feature was first proposed in 2005 and was standardized to become part of Release 6 of the 3GPP specification in 2005.

The Repeated SACCH procedure is described in a specification document adopted by the $3^{rd}$-Generation Partnership Project (3GPP): 3GPP TS 44.006, "Mobile Station-Base Station System (MS-BSS) interface; Data Link (DL) layer specification," v. 10.0.0, March 2011. According to the details of this specification, for SACCH reception on the downlink a mobile station first attempts to decode a SACCH frame by itself. If this decoding fails, as indicated by a failed Cyclic Redundancy Check (CRC), the mobile notifies the network by setting the SACCH Repetition Request indicator bit on the uplink SACCH to "SACCH Repetition Required". Next, when the mobile receives the repeated SACCH block, it makes a second attempt to decode the frame, this time after combining it with the previously received SACCH frame.

In the repeated transmission, the same information (frame) is transmitted the second time, without any modification or any other change in the retransmitted burst. After both bursts of data have been received, their energy values are combined and fed to a decoder to make a hard decision. Thus, the energy corresponding to each bit in the frame is effectively averaged, via the combining, and then compared to a threshold value to determine whether the received bit is high or low.

The Repeated SACCH technique only partially exploits time diversity, and there is further scope left to improve this technique in the receiver implementation technique. Because repeated SACCH and FACCH is generally utilized only during conditions of low signal power, the SACCH and FACCH message blocks suffer from both AWGN noise and channel fading. Accordingly, further improvements in decoding these messages are needed.

SUMMARY

Conventional techniques for decoding repeated messages sent from a remote transmitter can be improved by more fully exploiting the decoding gain obtained from the decoding of the first transmission and by augmenting Chase combining techniques with a voting-based combining method. Significant performance enhancements, which in a wireless communication system can translate into improved handovers and call maintenance, are achieved with these improved techniques.

Non-limiting example embodiments of these improved techniques are described herein in the context of SACCH and/or FACCH decoding in a GSM communication system. Once the SACCH block is decoded in the first time reception, decoded SACCH information bits are available. Even though the decoding process fails, as indicated by a failed Cyclic Redundancy Check (CRC), the de-interleaving and convolutional decoding processes applied to the first-time block provide a considerable amount of processing gain, as much as 2 to 3 dB. These processes will often correct many of the soft bits produced by the demodulation and equalization processing of the receiver. In several embodiments of the present invention, these decoded bits are later used in the combining process, as feedback information from the channel decoder. This helps to boost the performance gain.

Accordingly, when the repeated SACCH block's data is later received, the receiver circuit then demodulates and generates corresponding soft bits. At this point there are three sets of information bits that are available, for the same transmitted SACCH data. First, soft bits from the first transmission are available. Second, decoded SACCH bits from the first transmission are also available. While some of these bits are in error, as indicated by the failed CRC, many of them are likely to be correct. Finally, soft bits from the repeated transmission are available. In several embodiments of the present invention, all three of these sources of information are employed in a voting method used to select the sign of the repeated blocks soft bits. In addition, in several embodiments of the invention a new combining method is used to generate modified soft values for the repeated block.

An example method for decoding a repeated message sent from a remote transmitter begins with the receiving of first encoded bits, corresponding to a first transmission of an encoded data block. The first encoded bits are demodulated, to obtain first soft bits S1, each having a sign value and a magnitude. The first soft bits S1 are decoded, to obtain first decoded bits. In some embodiments, these first decoded bits correspond to a first transmission of a data block (such as a FACCH or SACCH message), and a CRC is evaluated to determine whether a message repeat flag should be sent to the transmitting station, to trigger a second transmission of the data block. Second encoded bits, corresponding to this second transmission of the repeated message, are received and then demodulated, to obtain second soft bits S2.

The first decoded bits are re-encoded, using the same encoding process used by the remote transmitter, to obtain re-encoded bits H1. Because of the coding gain, the sign values for some of the re-encoded bits may differ from the corresponding soft bits. Sign values for modified soft bits S2' are then determined, using the first soft bits, the second soft bits, and the re-encoded bits. In several embodiments, this is done by assigning each modified soft bit a sign value equal to the sign values for at least two of the corresponding first soft bit, the corresponding second soft bit, and the corresponding re-encoded bit.

In some embodiments, the modified soft bits are given the magnitude values for the corresponding second soft bits. The resulting modified soft bits may be combined with the first soft bits before a final decoding process. Alternatively, these modified soft bits can be decoded directly.

In other embodiments, the modified soft bits S2' can be assigned magnitudes that depend on the sign values for the first soft bits, the sign values for the re-encoded bits, and the sign values for the second soft bits. The sign values for each re-encoded soft bit $H1[i]$, the corresponding first soft bit $S1[i]$, and the corresponding second soft bit $S2[i]$ are evaluated to determine whether they are all equal. If so, then the confidence value (i.e., magnitude) for the modified soft bit $S2'[i]$ is set to a highest value, indicating the highest confidence in the corresponding sign value. If the three sign values for $S1[i]$, $H1[i]$, and $S2[i]$ are not all the same, then the sign values are evaluated to determine whether the sign value for the re-encoded soft bit $H1[i]$ is equal to the sign value for either the first soft bit $S1[i]$ or the second soft bit $S2[i]$. If so, then the confidence value for the modified soft bit $S2'[i]$ is assigned the magnitude for whichever of the corresponding first and second soft bits has a sign value equal to the sign value for the re-encoded soft bit $H1[i]$. Otherwise, the confidence value for the modified soft bit $S2'[i]$ is assigned the magnitude of the first soft bit.

Other approaches to determining the magnitude of the modified soft bits are possible. For instance, one approach is to obtain the magnitude for the modified soft bit $S2'[i]$ by simply averaging the magnitudes for the first soft bits $S1[i]$, $S2[i]$, and $H1[i]$. A more general approach is to compute a weighted sum of these three magnitudes—a simple average of the three magnitudes is the special case where all three weights are equal.

The modified soft bits can be used in various ways to determine a final decoded output corresponding to the repeated message. In some embodiments, each modified soft bit is combined with the corresponding first soft bit, to obtain final soft bits, and then the final soft bits are decoded to obtain final decoded bits. In others, each modified soft bit is instead combined with the corresponding second soft bit to obtain the final soft bits for decoding. In still other embodiments, the modified soft bits are directly decoded to obtain final decoded bits.

Receiver circuits and base station circuits corresponding to the above summarized techniques and variants therefore are also described in detail. The techniques and apparatus described herein can provide a significant performance gain, e.g., 1.0 to 2.0 dB, over conventional techniques for processing repeated SACCH and FACCH messages. Of course, those skilled in the art will appreciate that the present invention is not limited to the above features, advantages, contexts or examples, and will recognize additional features and advantages upon reading the following detailed description and upon viewing the accompanying drawings.

BRIEF DESCRIPTION OF THE DRAWINGS

FIG. 10 illustrates an example of software source code for implementing the soft bit modification techniques.

DETAILED DESCRIPTION

Figure 1:
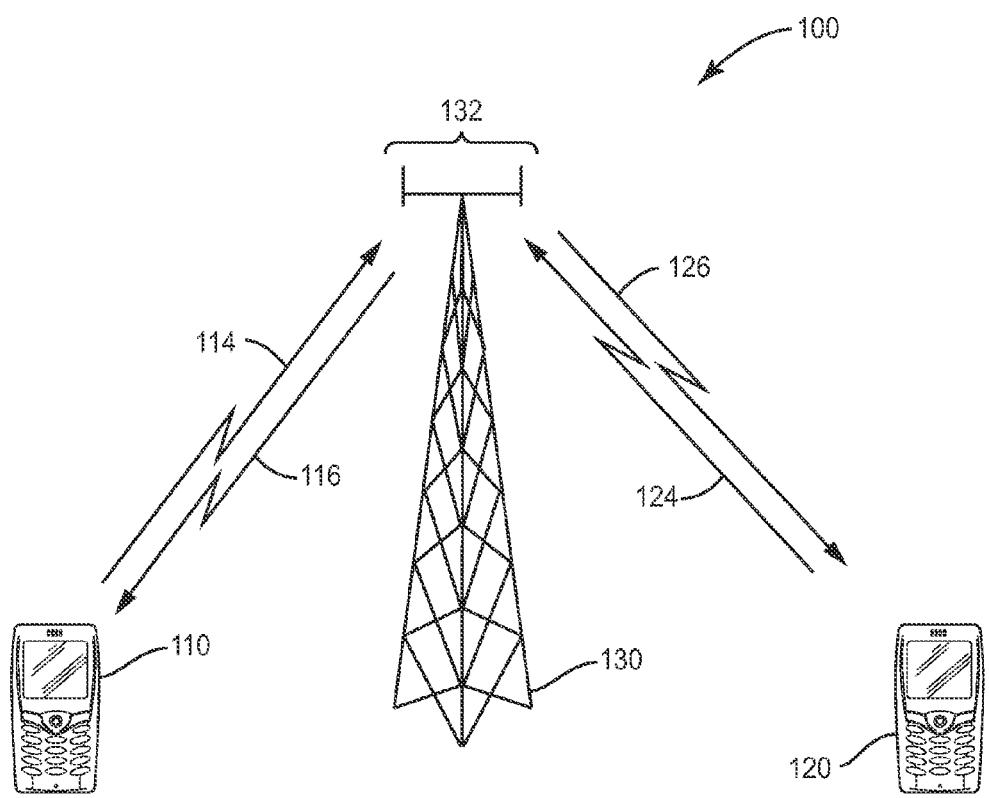
FIG. 1 illustrates a wireless communication system in accordance with some embodiments of the present invention.

Various embodiments of the present invention are now described with reference to the drawings, where like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for GSM systems is used throughout this document to describe the invention, this should not be seen as limiting the scope of the invention to only these systems. Other communication systems that employ repeated transmissions of data to improve reliability may also benefit from exploiting the ideas covered herein.

FIG. 1 illustrates components of a wireless network 100, including mobile stations 110 and 120 and base station 130. Base station 130 communicates with mobile stations 110 and 120 via one or more antennas 132; individual ones or groups of these antennas are used to serve pre-defined sectors and/or to support any of various multi-antenna transmission schemes, such as multiple-input multiple-output (MIMO) transmission schemes. In the system illustrated in FIG. 1, mobile station 110 is communicating with base station 130 over an uplink (mobile station-to-base station) 114 and a downlink (base station-to-mobile station) 116. Similarly, mobile station 120 is communicating with base station 130 over an uplink 124 and a downlink 126.

Several of the embodiments are described herein in connection with a receiver circuit in a radio access terminal such as the mobile stations 110 and 120 illustrated in FIG. 1. A radio access terminal, which communicates wirelessly with fixed base stations in the wireless network, can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Similarly, various embodiments are described herein in connection with a wireless base station, such as the base station 130 illustrated in FIG. 1. The wireless base station 130 communicates with access terminals and is referred to in various contexts as an access point, Node B, Evolved Node B (eNodeB or eNB) or some other terminology. Although the base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

Figure 2:
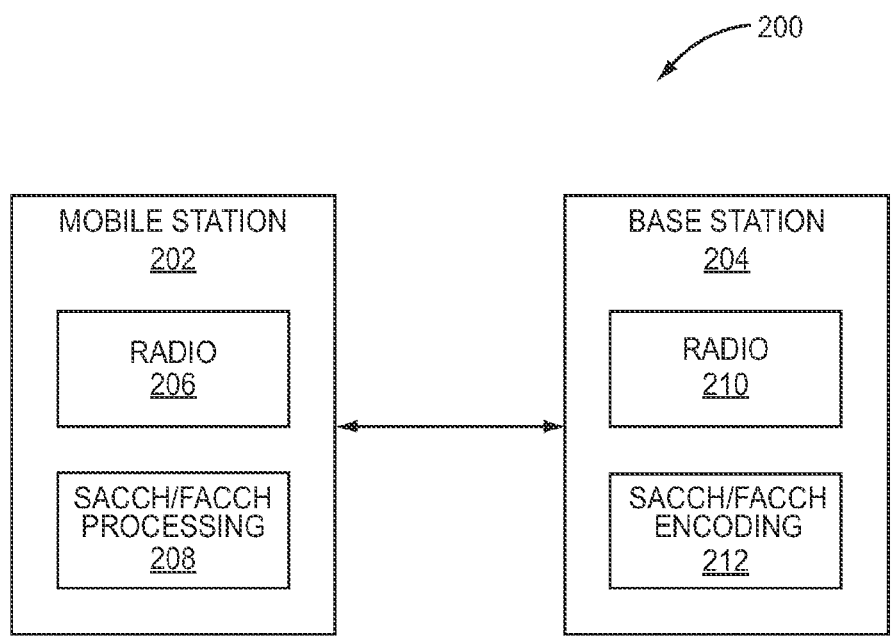
FIG. 2 is a block diagram illustrating elements of a retransmission control system.

FIG. 2 is a block diagram illustrating a few of the functional elements relevant to processing of control channel messages in a GSM wireless communication system. System 200 includes a mobile station 202, which communicates with a base station 204 via a downlink and uplink. (The terms "forward link" and "reverse link" are sometimes used instead of "downlink" and "uplink".) Mobile station 202 includes radio circuitry 206 and SACCH/FACCH processing circuit 208, while base station 204 includes corresponding radio circuitry 210 and SACCH/FACCH encoding circuit 212. These functional modules, which may be implemented as electronic hardware or as a combination of hardware and software, interact according to one or several of the techniques described herein to perform retransmission-related processing.

Figure 3A:
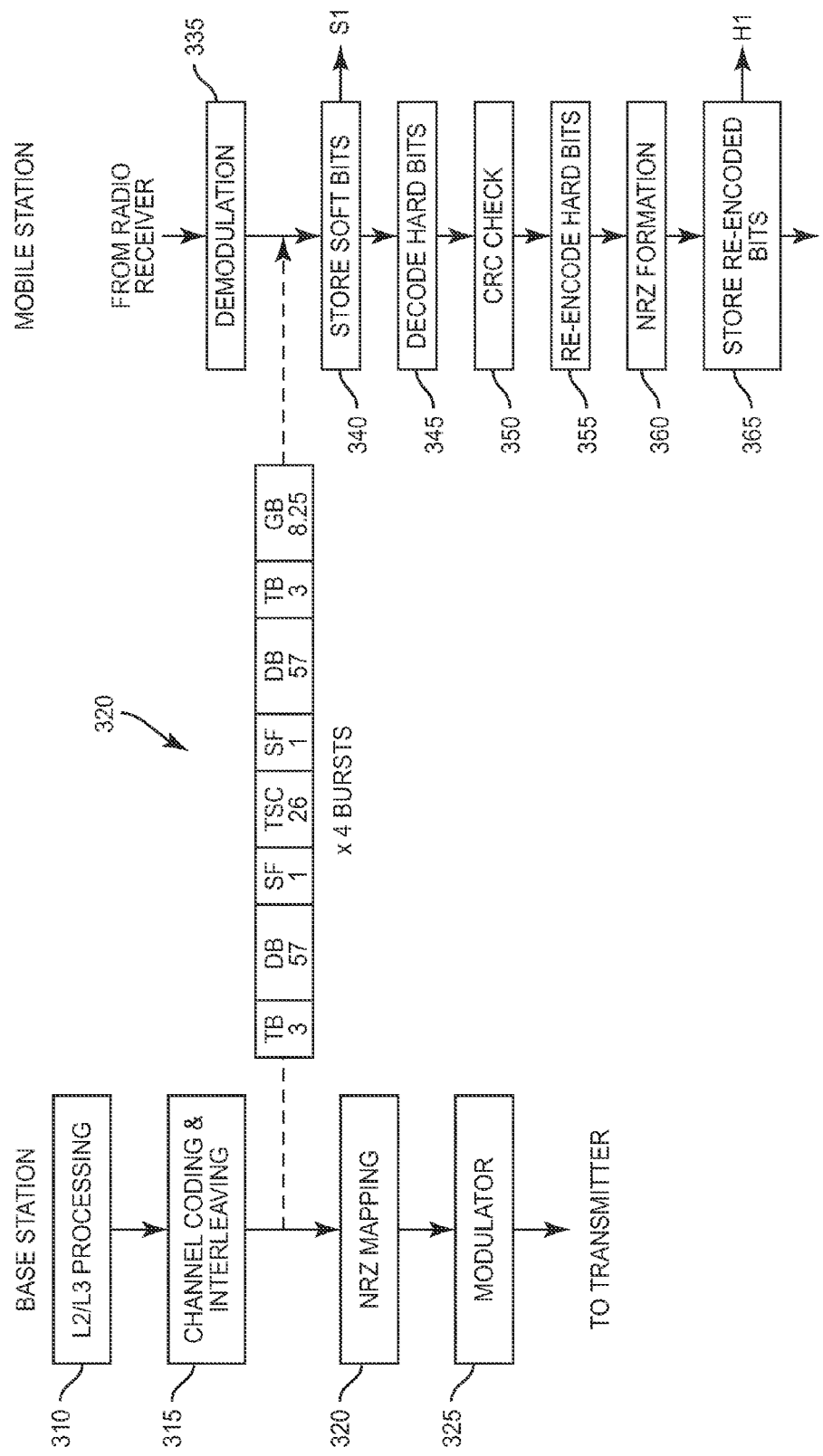
FIG. 3A illustrates SACCH/FACCH processing for a first transmission of a SACCH or FACCH block.
Figure 3B:
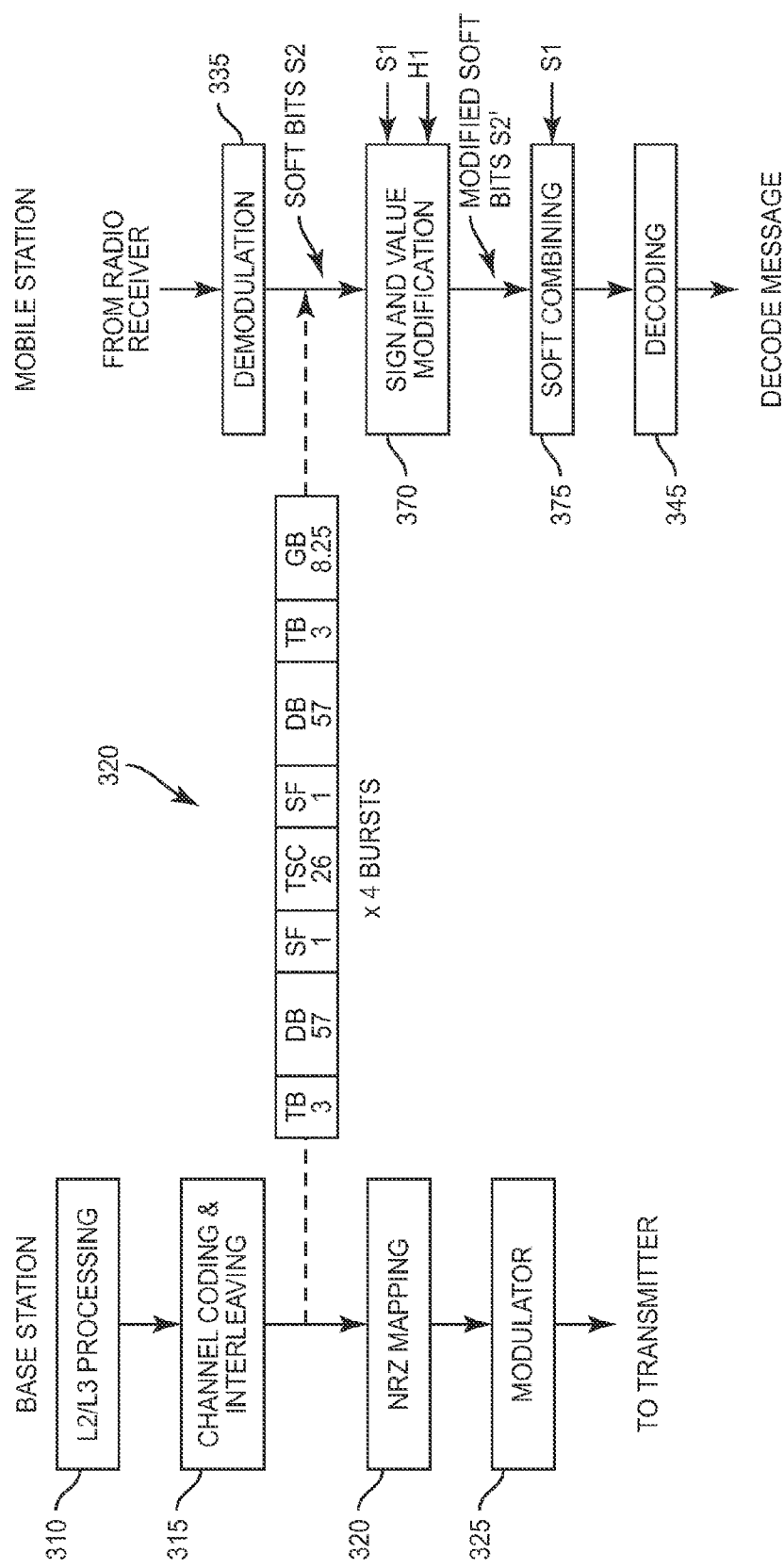
FIG. 3B illustrates SACCH/FACCH processing for a second transmission of a SACCH or FACCH block

FIGS. 3A and 3B illustrate the processing of repeated messages in a base station and a mobile station. More particularly, FIG. 3A illustrates the processing of a first transmission of a data block, while FIG. 3B illustrates the processing of a second transmission of the same data block. While FIGS. 3A and 3B illustrate details of encoding and decoding of a SACCH and/or FACCH block in a GSM system, it will be appreciated that the illustrated process may be readily adapted to other communication systems in which retransmissions are employed in response to decoding failures.

In both FIGS. 3A and 3B, base station processing, illustrated on the left-hand side of each figure, proceeds according to the process described in the GSM specifications. Control channel messages to be sent to the mobile station via the SACCH or FACCH are generated by Layer 2 and Layer 3 (L2/L3) processing, as shown at block 310. As shown at block 315, these messages, which are 184 bits in length, are then processed by a channel coder and an interleaver module, which produces a total of 464 encoded bits. These 464 encoded bits include several "stealing bits" that are used to distinguish data bursts containing control data from data bursts that contain traffic data. As is well known to those familiar with the details of the GSM system, this coding includes the use of a block parity code known as a "Fire" code, as well as a rate-1/2, $4^{th}$-order convolutional code.

These 464 encoded bits are divided by the interleaver among four "bursts," one of which is shown in FIGS. 3A and 3B as burst 320. Each burst has 3 "tail bits" (TB) at the beginning and near the end of the burst and a 26-bit equalizer training sequence (TSC) in the middle. A guard period (GB) of 8.25 bits is at the end of each burst, and 116 bits of the encoded data bits are split between two data regions on either side of the training sequence, with 57 data bits and a stealing bit on each side.

The assembled bursts are then processed by a NRZ mapping module, as shown at block 325, which effectively maps "0" values for each bit of the burst to a "1" (or "HIGH") value for the transmitted output and maps each "1" value to a "−1" (or "LOW") value for the transmitted output. Finally, the NRZ-mapped bits are modulated, as shown at block 330, and the modulated signal is routed to a radio transmitter circuit for transmission to the mobile station.

At the other end of the link, illustrated on the right-hand side of FIG. 3A, the radio signal is received by a radio receiver circuit and then demodulated, as shown at block 335. For a given burst, the output of the demodulator module is 116 soft values, corresponding to the 116 encoded bits in the burst. It will be appreciated that the receiving and demodulation process includes equalization and synchronization processes, among other things, but because the details of these processes are not important to an understanding of the present invention they are omitted from FIGS. 3A and 3B and are not discussed further herein.

As shown at block 340, the soft bits from the demodulation process are stored, for later use. Because each of the four GSM bursts in a message includes 116 bits, there are a total of 464 stored softbits, shown in FIG. 3A as "S1."

The softbits produced by the demodulation module are also fed to a decoder/de-interleaver module, represented in FIG. 3A at block 345. The decoder/de-interleaver reverses the interleaving and channel-coding processes performed at the transmitter, and produces 184 decoded "hard" bits from the 464 soft bits.

As shown at block 350, the success of the decoding process is checked, using a Cyclic Redundancy Check (CRC) code. A detected error in decoding causes the mobile to set a SACCH Repetition Request (not shown in FIG. 3A), which will trigger the base station to transmit an identical message in the next frame after the first transmission. For FACCH, it is repeated after eight frames, or nine, if an idle frame is in the eight frames following the first transmission.

At this point in the illustrated process, the mobile station receiver has two, related, sources of information about the first transmitted burst. First, it has the 464 soft bits S1 that were stored earlier. Second, the receiver has the 184 decoded hard bits. Although some of these bits are in error, these bits still benefit from the coding gain.

Of course, the 184 decoded bits and the 464 soft bits are not directly comparable. Accordingly, as shown at blocks 355 and 360 the hard bits are re-encoded, using the same block coding and convolutional coding process originally used by the transmitter, and converted to Non-Return to Zero (NRZ) format. The resulting re-encoded soft bits H1 are then stored, as shown at block 356, for use in decoding the second transmission of the message block.

FIG. 3B shows the processing of the second transmission of the repeated message block. In the illustrated process, the base station processing is identical to that used for the first block, resulting in an identical set of four bursts 320. As will be discussed later, it is possible, although unnecessary, to modify the ordering and/or coding of the bits in the base station's processing of the repeated message, to further improve processing. In a GSM application, however, the processing at the base station may be left unmodified, so that modifications to deployed equipment are unnecessary.

At the other end of the radio link, the mobile station's initial processing steps are also unaltered. Thus, as shown at block 335, the received data block is demodulated, resulting in a second set of soft bits S2. At this point, however, the information from the first decoding process, i.e., soft bits S1 and re-encoded soft bits H1, is used to modify the soft bits S2, as shown at block 370, resulting in modified soft bits S2'. More particularly, as will be described in more detail below, the signs (i.e., the polarity) of the soft bits S1 and re-encoded soft bits H1 are used in a "voting" process to modify some of the signs of the soft bits S2. In some embodiments, information from soft bits S1 and re-encoded soft bits H1 is also used to modify the values of soft bits S2.

In either case, the modified soft bits S2' are combined with soft bits S1, as shown at block 375, e.g., in a Chase combining process. The resulting combination is then decoded and de-interleaved, as shown at block 345, to yield the final, 184-bit, decoded message.

In several embodiments of the invention, a voting method is used for modifying the sign values for the repeated burst's soft bits S2. The sign values for the re-encoded soft bits H1 (where a "0" value from the coder has a "positive" sign value and a "1" has a negative sign value) and the sign values for the received soft bits S1 (before decoding) for the first time transmission are both considered, along with the sign values for the received soft bits S2 from the second transmission of the data.

Thus, for each soft bit S2[$i$], where i is an index pointing to one of bits 1 . . . N in the encoded block, three sign values are considered: the sign value for soft bit S2[$i$], the sign value for soft bit S1[$i$], and the sign value for the corresponding re-encoded soft bit H1[$i$]. Of these three sign values, at least two, and sometimes all three, will have the same sign. This majority sign value is assigned to the modified soft bit S2'[$i$]. In other words, if soft bit S2[$i$] has a sign value that differs from the sign value for both S1[$i$] and H1[$i$], the sign value of S2[$i$] is reversed in forming modified soft bit S2'[$i$]. Otherwise, the sign value is unchanged. This process is repeated for each of the 464 soft bits of the received data for the second transmission of the message block.

The sign value modification process described above will yield improved decoding performance when the modified soft bits S2'[$i$] are combined with the corresponding soft bits S1[$i$] prior to decoding. This improvement comes about because the modified soft bits S2' incorporate information obtained from the re-encoded soft bits H1, which benefit from the coding gain obtained from the block coding and convolutional coding processes used to generate the transmitted message blocks. Further improvement can be obtained by using information from the re-encoded soft bits H1 to modify the magnitudes of the modified soft bits S2'.

As will be appreciated by those familiar with coding techniques, the magnitudes of the soft bits can be considered to represent a "confidence" value, or a probability that the assigned value is correct. In the decoding process, a higher confidence value for a given soft bit means that a higher weight is placed on that soft bit and that the soft bit thus has a higher impact on the final decoded bits than soft bits having lower confidence values. Here, there are again three sources of information to consider when determining whether the confidence value for a given soft bit S2[$i$] should be modified: the sign value for the first-received soft bit S1 [$i$], the sign value for the re-encoded soft bit H1[$i$], and the sign value for the second-received soft bit S2[$i$].

If all three of these soft bits (S1[$i$], H1[$i$], and S2[$i$]) have the same sign, this indicates that a hard thresholding decision on all three would yield the same result. In this case, the magnitude of the modified soft bit S2'[$i$] is assigned a highest confidence value, e.g., a value of 1 if the soft bit magnitudes range from 0 to 1.

Otherwise, i.e., if only two of the three soft bits S1[$i$], H1[$i$], and S2[$i$] have the same sign values, then the modified soft bit S2'[$i$] is assigned the magnitude of one of the soft bits S1[$i$] or S2[$i$]. More particularly, if the sign values for S1[$i$] and S2[$i$] differ, then the modified soft bit S2'[$i$] is given the magnitude for the soft bit S1[$i$] or S2[$i$] that has a sign value that matches the sign value for H1[$i$]. If the sign values for S1[$i$] and S2[$i$] agree (and differ from the sign value for H1[$i$]), then the modified soft bit S2'[$i$] is given the magnitude for soft bit S2[$i$].

This modification process is illustrated in Table 1, below.

TABLE 1

| S1[$i$] sign value | H1[$i$] sign value | S2[$i$] sign value | Magnitude assigned to S2'[$i$] |
|---|---|---|---|
| + | + | + | Highest |
| + | + | − | S1[$i$] |
| + | − | + | S2[$i$] |
| + | − | − | S2[$i$] |
| − | + | + | S2[$i$] |
| − | + | − | S2[$i$] |
| − | − | + | S1[$i$] |
| − | − | − | Highest |

The modified soft bits S2'[$i$] are then combined with the corresponding soft bits S1[$i$] (from the first transmitted block) for decoding, using the conventional Chase combining approach. The combined soft values are passed to the decoder for the second-time decoding process.

Those familiar with conventional GSM processing will appreciate that the techniques described above require some changes to the processing at the mobile station, but none at all to the base station encoding and re-transmission processing. For the first-time processing, as illustrated in FIG. 3A, the storing of the soft bits (at block 340), and the re-encoding, interleaving, NRZ formation, and storing of re-encoded bits H1 (at blocks 355, 360, and 365) are added functions. For second-time processing, as illustrated at FIG. 3B, the sign and value modification module 370 are entirely new functions. No extra decoding is needed.

FIG. 10 provides an example of software source code for implementing the soft bit modification techniques described above. Receiver processes that are unchanged or reused are referenced in software code flow of FIG. 10, but are not reproduced.

Laboratory simulations of the techniques described above demonstrate a significant improvement of bit-error rate (BER) performance for repeated SACCH and FACCH channels, compared to an approach that uses only conventional Chase combining. This helps to improve soft bit quality (SFQ values), raw BER, and frame-error rate (FER) in all propagation conditions, and improves the sensitivity level. The simulation has been performed using several different types of equalizer and demodulators (e.g., temporal whitening, SAIC; DFSE). In each case, very good improvement was observed.

Table 2 illustrates the simulated performance improvement for repeated SACCH channel decoding, under several different channel conditions. In each case, the performance improvement resulting from the techniques described above is significant.

TABLE 2

| Propagation condition | $E_b/N_0$ values (in dB) with modified soft bits | $E_b/N_0$ values without modified soft bits | Performance Gain (dB) |
|---|---|---|---|
| Static channel (1 tap AWGN) | 3GPP Cross-Over = −3.4 (* as defined in 3GPP TS45.005, the reference performance for Repeated Downlink FACCH and Repeated SACCH shall be FER ≤5%) | 3GPP Cross-Over = −1.8 | +1.6 |
| Typical Urban (MS speed 50 km/h, no Frequency hopping) | 3GPP Cross-Over = −0.5 | 3GPP Cross-Over = 1.4 | +1.9 |
| Hilly Terrain (MS speed 100 km/h, no Frequency hopping) | 3GPP Cross-Over = 0.4 | 3GPP Cross-Over = 2.1 | +1.7 |

Figure 4:
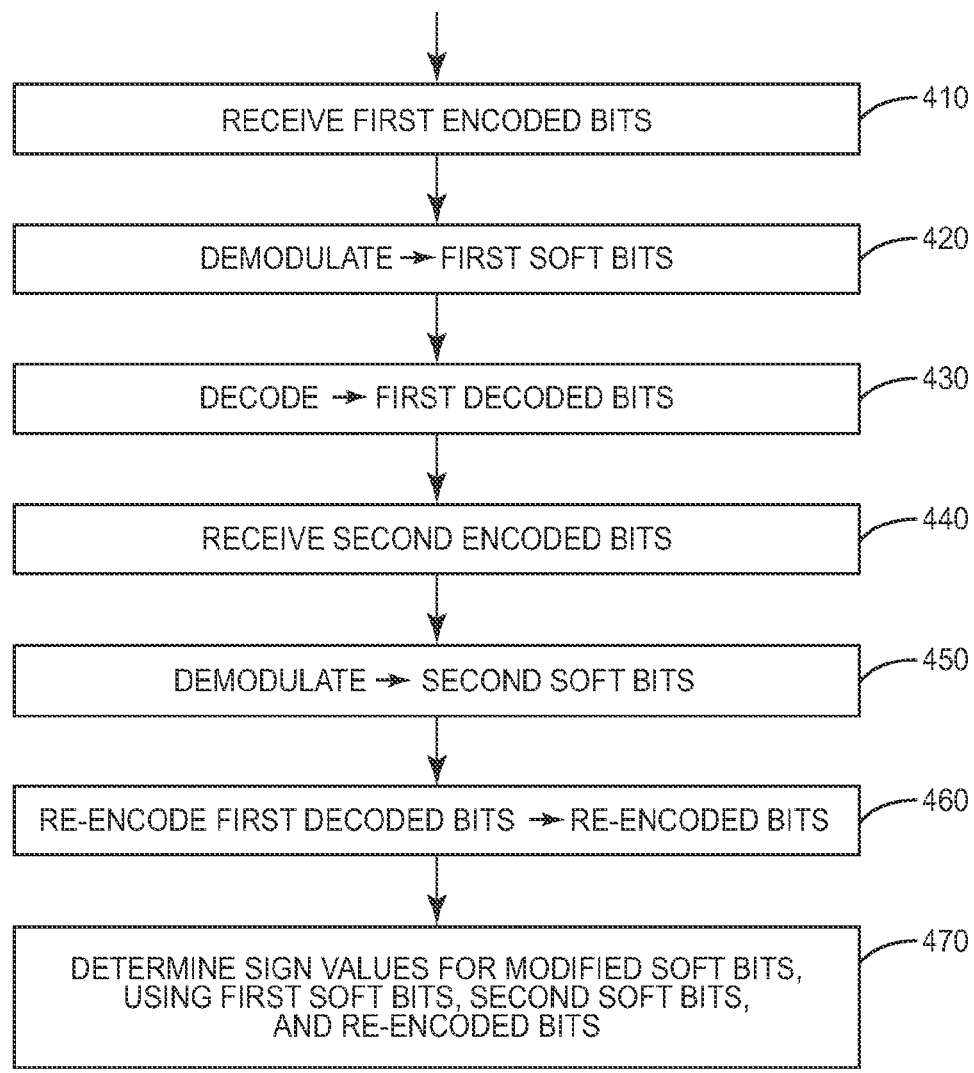
FIG. 4 is a process flow diagram a method for decoding a repeated message sent from a remote receiver.

While the techniques discussed above have been described in the specific context of a GSM network, and even more specifically in the context of repeated SACCH and repeated FACCH processing, it will be appreciated that these techniques are more generally applicable, and may be adapted to other communications networks and other situations where repeated transmissions are used to improve error performance. For example, FIG. 4 illustrates a generalized process for decoding a repeated message sent from a remote transmitter. This process can be implemented in a variety of communications receivers that are configured to process repeated transmissions of messages, including GSM receivers adapted to process repeated SACCH or FACCH transmissions.

The illustrated process begins, as shown at block 410, with the receiving of first encoded bits, corresponding to a first transmission of an encoded data block. It should be noted that the terms "first" and "second," as used in this discussion, do not necessarily indicate the order in which the data blocks are received, or the order in which they are processed. In several embodiments, the first-received data block is the one that is decoded and then re-encoded (as illustrated at block 460). However, in other embodiments, the second-received data block may be the one that is decoded and re-encoded, in which case it would contain the "first" encoded bits of FIG. 4.

As shown at block 420, the first encoded bits are demodulated, to obtain first soft bits. Each of these first soft bits has a sign value and a magnitude. It will be appreciated that the sign values for the soft bits can be interpreted in a number of ways, as long as the interpretation is consistent. For instance, if the soft bits are in NRZ format, e.g., ranging from −1 to +1, the sign value for each soft bit is simply "−" or "+". If the soft bits instead range from 0 to 1, the sign value can be interpreted as "−" if the value is below 0.5000 and "+" if the value is above (or equal to) 0.5000. Of course, the polarity can be reversed, again provided only that the interpretation is consistent.

As shown at block 430, the first soft bits are decoded, to obtain first decoded bits. In some embodiments, these first decoded bits correspond to a first transmission of a data block (such as a FACCH or SACCH message), and a CRC is evaluated to determine whether a message repeat flag should be sent to the transmitting station, to trigger a second transmission of the data block. This is not illustrated in FIG. 4.

As shown at blocks 440 and 450, second encoded bits, corresponding to a second instance of the repeated message, are received and then demodulated, to obtain soft bits. As was the case with the first soft bits, each of the second soft bits has a sign value and a magnitude.

As shown at block 460, the first decoded bits are re-encoded, using the same encoding process used by the remote transmitter, to obtain re-encoded bits, each of the re-encoded bits having either a positive or negative sign value. Because the same encoding process used by the transmitter is used, this re-encoding step yields bits that correspond, one-for-one, to the first soft bits. However, because of the coding gain, the sign values for some of the re-encoded bits may differ from the corresponding soft bits. Further, because the decoding process yields "hard" decision bits, the re-encoded bits will have the highest confidence values, while the corresponding soft bits will generally have confidence values that are less than the maximum.

Finally, as shown at block 470, sign values for modified soft bits are determined, using the first soft bits, the second soft bits, and the re-encoded bits. In several embodiments, this is done by assigning each modified soft bit a sign value equal to the sign values for at least two of the corresponding first soft bit, the corresponding second soft bit, and the corresponding re-encoded bit.

In some embodiments, the modified soft bits are given the magnitude values for the corresponding second soft bits. The resulting modified soft bits, as discussed above, may be combined with the first soft bits before a final decoding process. Alternatively, these modified soft bits can be decoded directly.

Figure 5:
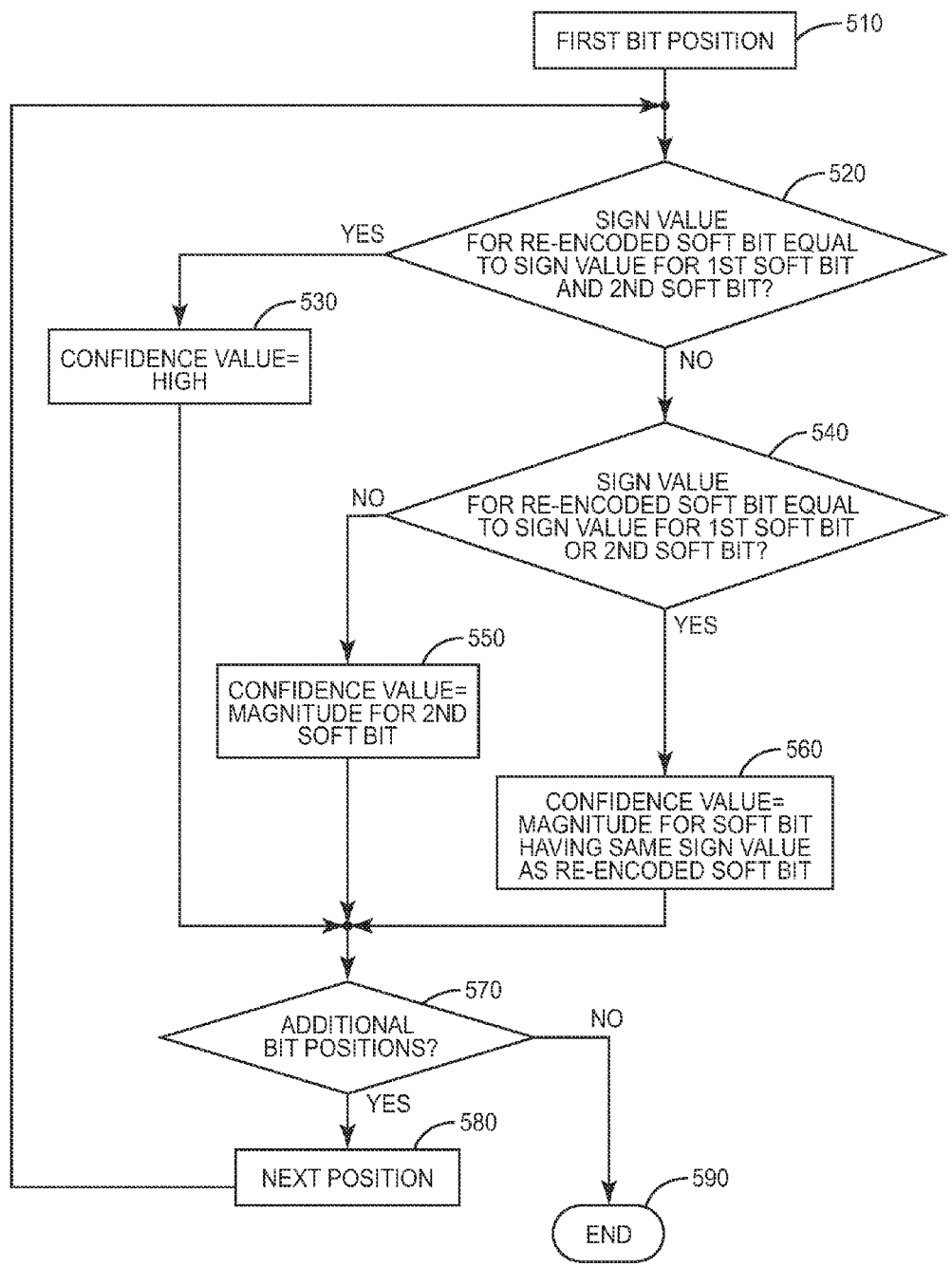
FIG. 5 is a process flow diagram illustrating details of an example technique for determining sign values for modified soft bits of a repeated message transmission.

In other embodiments, the modified soft bits can be assigned magnitudes that depend on the sign values for the first soft bits, the sign values for the re-encoded bits, and the sign values for the second soft bits. One example process for determining the magnitudes for the modified soft bits is illustrated in FIG. 5.

The illustrated process is a bit-by-bit process, and thus begins, as indicated at block 510, at a first bit position. First, the sign values for the re-encoded soft bit H1[$i$], the corresponding first soft bit S1[$i$], and the corresponding second soft bit S2[$i$] are evaluated to determine whether they are all equal, as shown at block 520. If so, then the confidence value (i.e., magnitude) for the modified soft bit S2'[$i$] is set to a highest value, indicating the highest confidence in the corresponding sign value, as shown at block 530.

If the three sign values for S1[$i$], H1[$i$], and S2[$i$] are not all the same, then the sign values are evaluated to determine whether the sign value for the re-encoded soft bit H1[$i$] is equal to the sign value for either the first soft bit S1[$i$] or the second soft bit S2[$i$], as shown at block 540. If so, then the confidence value for the modified soft bit is assigned the magnitude for whichever of the corresponding first and second soft bits has a sign value equal to the sign value for the re-encoded soft bit, as shown at block 560. Otherwise, the confidence value for the modified soft bit is assigned the magnitude of the second soft bit, as shown at block 550.

If there are additional bit positions to be processed, as indicated at block 570, then the process moves to the next bit position, as shown at block 580, and the process repeats for the next bit. Otherwise, the modification ends, as shown at block 590.

Other approaches to determining the magnitude of the modified soft bits are possible. For instance, one approach is to obtain the magnitude for the modified soft bit by simply averaging the magnitudes for the first soft bits S1[$i$], S2[$i$], and H1[$i$]. A more general approach is to compute a weighted sum of these three magnitudes—a simple average of the three magnitudes is the special case where all three weights are equal. Optimal weights may be determined by simulation for a given system, propagation conditions, and/or error rate criterion. In some embodiments, these weights may be dynamically tuned, based, for example, on measurements of signal quality, decoding performance (e.g., bit-error rate), and/or channel conditions.

The modified soft bits can be used in various ways to determine a final decoded output corresponding to the repeated message. In some embodiments, each modified soft bit is combined with the corresponding first soft bit, to obtain final soft bits, and then the final soft bits are decoded to obtain final decoded bits. In others, each modified soft bit is instead combined with the corresponding second soft bit to obtain the final soft bits for decoding. In still other embodiments, the modified soft bits are directly decoded to obtain final decoded bits.

The techniques described in detail above can be implemented in a wireless receiver, such as a GSM receiver, without any changes needed to the base station transmitter. These techniques can also be extended to use symbol diversity and placement diversity transmission by, for example, reversing the order of data bits in the repeated transmission, so that those bits that are closest to the training sequence in the first burst are furthest away from the training sequence in the second transmission. This variation, however, requires changes to the encoding process at the base station. When the repeated transmission is received at the mobile station in these embodiments, the order of the second soft bits must be reversed before determining the sign values for the modified soft bits.

In another variant of these techniques, the base station's encoding process is modified so that the encoded bits in the second instance of the transmission are modified (relative to the first instance) using a pre-determined mask pattern, i.e., a mask pattern that is known to both the encoding transmitter station and the receiving station. When the second instance of the transmission is reserved, the receiver circuit rearranges or modifies the generated soft bits for the corresponding second soft bits, according to the mask pattern, before determining the sign values for the modified soft bits. This approach ensures that the transmitted waveform for the second transmission differs from the waveform for the first transmission, providing an additional form of diversity that can translate into additional decoding performance gains under some circumstances.

Figure 6:
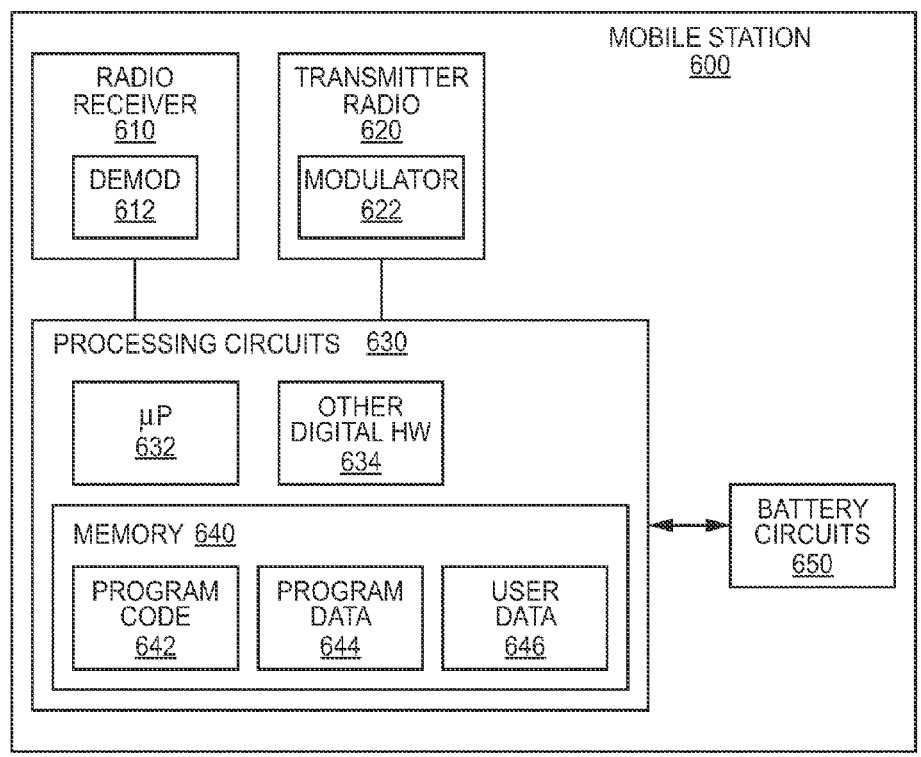
FIG. 6 is a block diagram of an example mobile station configured according to some embodiments of the present invention.

Several of the techniques described above, including the processes illustrated in FIGS. 4 and 5, may be implemented in a receiver circuit, such as a receiver circuit for a GSM mobile station. FIG. 6 is a block diagram of an example mobile station 600 that includes a receiver circuit configured to decode a repeated message sent from a remote transmitter, according to any of the techniques disclosed herein. More particularly, mobile station 600 may be configured to implement the methods illustrated in FIGS. 4 and 5, or variants thereof. Mobile station 600 includes a receiver radio circuit 610, which includes various radio-frequency components (not shown) and a demodulator circuit 612 to convert the received radio signal into demodulated soft bits. Receiver radio circuit 610 processes radio signals received from one or more wireless base station and processes the signals, using known radio processing and signal processing techniques, to convert the received radio signals into digital samples for processing by processor circuits 630.

Processing circuits 630 extract data from signals received via receiver 610, including control data extracted from FACCH and/or SACCH messages, and generate information for transmission to the wireless base station via transmitter radio circuit 620, including control information such as a SACCH repeat request flag. Like the receiver 610 and demodulator 612, transmitter 620 and modulator 622 use known radio processing and signal processing components and techniques, typically according to one or more telecommunications standards such as the 3GPP standards for GSM, and are configured to format digital data and generate and condition a radio signal, from that data, for transmission over the air.

Processing circuits 630 comprise one or several microprocessors 632, digital signal processors, and the like, as well as other digital hardware 634 and memory circuit 640. Memory 640, which may comprise one or several types of memory such as read-only memory (ROM), random-access memory, cache memory, flash memory devices, optical storage devices, etc., stores program code 642 for executing one or more telecommunications and/or data communications protocols and for carrying out one or more of the techniques for decoding a repeated message described herein. Memory 640 further stores program data 644, user data 646 received from the wireless base station and to be transmitted to the base station, and also stores various parameters, pre-determined threshold values, and/or other program data for controlling the operation of the mobile station 600, including the stored soft bit values and stored re-encoded soft bits discussed earlier. Mobile station 600 obviously includes various other feature that are not shown, in addition to the battery circuits 650 pictured in FIG. 6; these features, such as user interface circuitry, positioning circuits, and the like, are well known to those skilled in the art and are therefore not illustrated.

Figure 7:
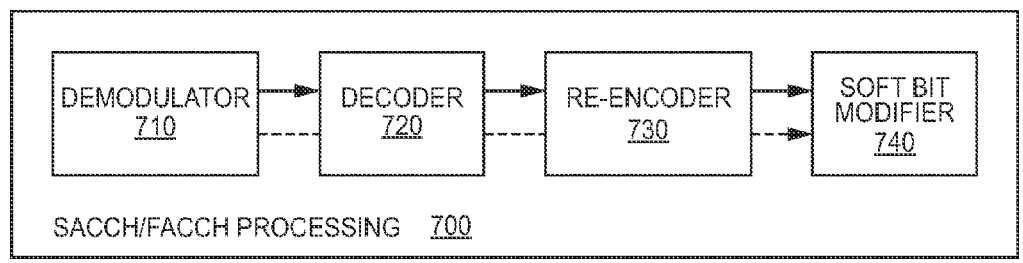
FIG. 7 illustrates a mobile station control circuit according to some embodiments of the present invention.

In several embodiments, processing circuits 630 are configured with appropriate program code 642 stored in memory 640 to implement one or more of the techniques described herein. Of course, not all of the steps of these techniques are necessarily performed in a single microprocessor or even in a single module. Thus, FIG. 7 presents a more generalized view of a SACCH/FACCH processing circuit 700 configured to carry out one or several of the demodulation and decoding techniques discussed herein. This processing circuit 700 may have a physical configuration that corresponds directly to demodulator 612 and processing circuits 630, for example, or may be embodied in three or more modules or units. In any case, however, processing circuit 700 is configured to implement at least four functions. These functions are pictured in FIG. 7 as demodulator 710, decoder 720, re-encoder 730, and soft bit modifier 740.

Demodulator 710 demodulates first encoded bits and second encoded bits from first and second instances of a repeated transmission of an encoded data block transmitted from a remote transmitter, such as a GSM base station. The output of demodulator 710 comprises first soft bits and second soft bits, respectively. Decoder circuit 720 decodes the first encoded bits to obtain first decoded bits, using a decoding process that complements the encoding process used by the remote transmitter. Re-encoder circuit 730 re-encodes the first decoded bits, using the same encoding process utilized by the remote transmitter, to obtain re-encoded soft bits. Soft bit modifier circuit 740 determines sign values for modified soft bits corresponding to the encoded message, based on the sign values for the first soft bits, the sign values for the second soft bits, and the sign values for the re-encoded bits. In some embodiments, soft bit modifier circuit 740 determines magnitudes for the modified soft bits using these three sign values as well. These modified soft bits are decoded directly (by decoder circuit 720) to obtain final decoded bits, in some embodiments. In others, the modified soft bits are combined with the first soft bits, with the resulting final soft bits then decoded by decoder circuit 720. In still others, the modified soft bits are combined with the second soft bits, with the resulting final soft bits then decoded by decoder circuit 720

Figure 8:
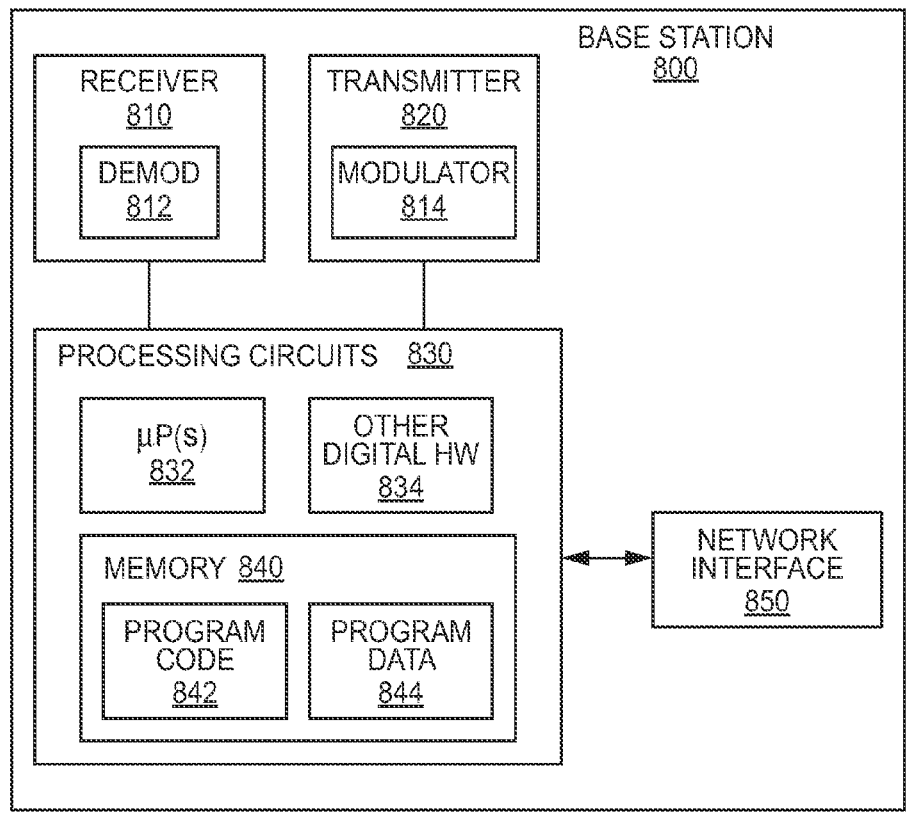
FIG. 8 is a block diagram of an example base station configured according to some embodiments of the present invention.

FIG. 8 is a block diagram of a wireless base station 800 configured to encode and transmit repeated messages in a wireless communication system, according to the techniques disclosed herein. Base station 800 includes a receiver circuit 810, which includes various radio-frequency components (not shown in detail) and a demodulator circuit 812. Receiver 810 processes radio signals received from one or more mobile stations and processes the signals, using known radio processing and signal processing techniques, to convert the received radio signals into digital samples for processing by processor circuits 830. Processing circuits 830 extract data from signals received via receiver 810 and generate information for transmission to the one or more mobile stations via transmitter circuit 820. Like the receiver 810 and demodulator 812, transmitter 820 and modulator 814 use known radio processing and signal processing components and techniques, typically according to a particular telecommunications standard such as the 3GPP standards for GSM, and are configured to format digital data and generate and condition a radio signal for transmission over the air.

Processing circuits 830 comprise one or several microprocessors 832, digital signal processors, and the like, as well as other digital hardware 834 and memory circuit 840. Memory 840, which comprises one or several types of memory such as read-only memory (ROM), random-access memory, cache memory, flash memory devices, optical storage devices, etc., stores program code 842 for executing one or more telecommunications and/or data communications protocols and for carrying out one or more of the encoding and transmission techniques described herein. Memory 840 further stores program data 844 as well as buffered traffic data received from mobile stations and from network interface 850, and also stores various parameters, pre-determined threshold values, and/or other program data for controlling the general operation of the base station 800.

Figure 9:
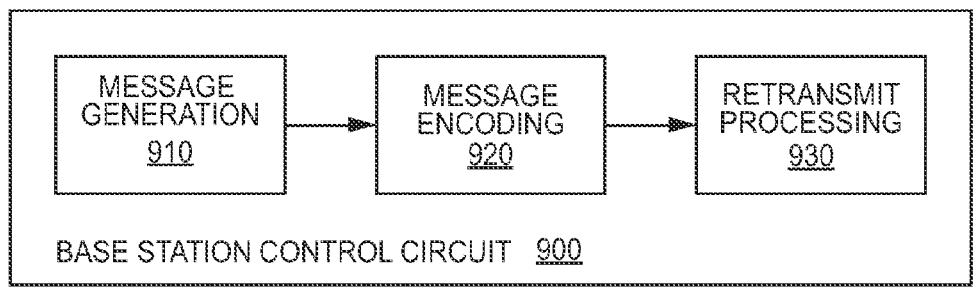
FIG. 9 illustrates a base station control circuit according to some embodiments of the present invention.

In various embodiments, processing circuits 830 are configured with appropriate program code 842 stored in memory 840 to implement one or more of the encoding and transmission techniques described herein. Of course, not all of the steps of these techniques are necessarily performed in a single microprocessor or even in a single module. FIG. 9 presents a more generalized view of a base station control circuit 900 configured to carry out one or several of the techniques described above. This base station control circuit 900 may have a physical configuration that corresponds directly to processing circuits 830, for example, or may be embodied in two or more modules or units. In any case, base station control circuit 900 is configured to implement at least three functions, which are pictured in FIG. 9 as message generation circuit 910, message encoding circuit 920, and retransmit processing controller 930.

Message generation circuit 910 forms control messages (or other messages to be sent to a mobile station) based on Layer 2 and Layer 3 processes. Message encoding circuit 920 encodes the message for transmission, using any of the encoding techniques described above and variants thereof. Retransmit processing circuit 930 determines whether a repeated transmission is necessary, based on, for example, the receipt of a repeat request flag from a mobile station, such as a SACCH Repeat Request.

Specific embodiments of the invention have been described above in the context of repeated SACCH and/or repeated FACCH processing in GSM systems. While the inventive techniques described herein are more generally applicable, these techniques provide several advantages in this context. The SACCH and FACCH are considered to be very important logical channels and the correct decoding for those channels makes the link quality robust. This in turn helps to reduce call drop rates and helps to improve the handover procedure.

The techniques described above can improve the repeated SACCH (FACCH) performance by 1.5 dB or more, which is a significant performance gain to improve the call drop and handover scenarios. Furthermore, these techniques improve the performance in all channel conditions including static channel as well as high fading channels like HT100 (i.e., the specification test case Hilly Terrain 100 km/h). In addition, these techniques add no extra computational complexity when implemented in GSM receivers. Because SACCH is interleaved over four bursts, no delay is involved for any extra decoding. The first time decoded data is used for feedback information, so there is no extra overhead incurred by additional decoding processing. Finally, several of these techniques are applicable to chase-combining techniques used in any wireless systems, and do not require any changes to 3GPP standards.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method in a communications receiver for decoding an encoded message sent from a remote transmitter, the method comprising:
receiving first encoded bits corresponding to a first transmission of the encoded message;
demodulating the first encoded bits to obtain first soft bits, each of the first soft bits having a sign value and a magnitude;
decoding the first soft bits to obtain first decoded bits;
receiving second encoded bits corresponding to a second transmission of the encoded message;
demodulating the second encoded bits to obtain second soft bits, each of the second soft bits having a sign value and a magnitude;
re-encoding the first decoded bits to obtain re-encoded bits, each of the re-encoded bits having either a positive or negative sign value; and
determining sign values for modified soft bits corresponding to the encoded message, based on the sign values for the first soft bits, the sign values for the second soft bits, and the sign values for the re-encoded bits.

2. The method of claim 1, wherein determining sign values for the modified soft bits comprises assigning each modified soft bit a sign value equal to the sign values for at least two of the corresponding first soft bit, the corresponding second soft bit, and the corresponding re-encoded bit.

3. The method of claim 1, further comprising determining a confidence value for each of the modified soft bits by:
assigning a highest confidence level to each modified sign bit for which the corresponding re-encoded soft bit has a sign value that is equal to both of the sign values for the corresponding first and second soft bits;
for each modified soft bit for which the corresponding re-encoded soft bit has a sign value that is equal to only one of the sign values for the corresponding first and second soft bits, assigning a confidence level equal to the magnitude for whichever of the corresponding first and second soft bits has a sign value equal to the sign value for the re-encoded soft bit; and,
for each modified soft bit for which the corresponding re-encoded soft bit has a sign value that is equal to neither of the sign values for the corresponding first and second soft bits, assigning a confidence level equal to the magnitude for the second soft bit.

4. The method of claim 1, further comprising determining a confidence value for each of the modified soft bits by:
computing, for each modified soft bit, a magnitude equal to a weighted average of the magnitudes for the first soft bit, the second soft bit, and the re-encoded soft bit, wherein each re-encoded soft bit has a magnitude corresponding to a highest confidence level.

5. The method of claim 4, wherein the magnitudes for the first soft bit, the second soft bit, and the re-encoded soft bit are weighted equally.

6. The method of claim 3, further comprising:
combining each modified soft bit with the corresponding first soft bit, to obtain final soft bits; and
decoding the final soft bits to obtain final decoded bits.

7. The method of claim 3, further comprising:
combining each modified soft bit with the corresponding second soft bit, to obtain final soft bits; and
decoding the final soft bits to obtain final decoded bits.

8. The method of claim 3, further comprising decoding the modified soft bits to obtain final decoded bits.

9. The method of claim 1, wherein the encoded message comprises a Slow Associated Control Channel (SACCH) message or a Fast Associated Control Channel (FACCH) message transmitted in a wireless network.

10. The method of claim 1, the method further comprising:
determining that the first decoded bits include an error; and
triggering the second transmission of the encoded message by sending a repetition request bit to the remote transmitter.

11. The method of claim 1, wherein the first and second transmissions of the encoded message have been subjected to the same encoding but the second transmission has been performed in reverse order from the first transmission, the method further comprising reversing the order of the second soft bits before determining the sign values for the modified soft bits.

12. The method of claim 1, wherein the second transmission of the encoded message has been modified with a pre-determined mask pattern, the method further comprising modifying the sign values for the second soft bits, according to the pre-determined mask pattern, before determining the sign values for the modified soft bits.

13. A receiver circuit comprising:
a radio frequency circuit configured to receive first encoded bits corresponding to a first transmission of an encoded message from a remote transmitter and to receive second encoded bits corresponding to a second transmission of the encoded message;
a demodulator circuit configured to demodulate the first encoded bits and the second encoded bits to obtain first soft bits and second soft bits, respectively, each of the soft bits having a sign value and a magnitude;
a decoder circuit configured to decode the first soft bits to obtain first decoded bits;

a re-encoder circuit configured to re-encode the first decoded bits to obtain re-encoded bits, each of the re-encoded bits having either a positive or negative sign value; and a soft bit modification circuit configured to determine sign values for modified soft bits corresponding to the encoded message, based on the sign values for the first soft bits, the sign values for the second soft bits, and the sign values for the re-encoded bits.

14. The receiver circuit of claim 13, wherein the soft bit modification circuit is configured to determine sign values for the modified soft bits by assigning each modified soft bit a sign value equal to the sign values for at least two of the corresponding first soft bit, the corresponding second soft bit, and the corresponding re-encoded bit.

15. The receiver circuit of claim 13, wherein the soft bit modification circuit is further configured to determine a confidence value for each of the modified soft bits by:

assigning a highest confidence level to each modified sign bit for which the corresponding re-encoded soft bit has a sign value that is equal to both of the sign values for the corresponding first and second soft bits;

for each modified soft bit for which the corresponding re-encoded soft bit has a sign value that is equal to only one of the sign values for the corresponding first and second soft bits, assigning a confidence level equal to the magnitude for whichever of the corresponding first and second soft bits has a sign value equal to the sign value for the re-encoded soft bit; and, for each modified soft bit for which the corresponding re-encoded soft bit has a sign value that is equal to neither of the sign values for the corresponding first and second soft bits, assigning a confidence level equal to the magnitude for the second soft bit.

16. The receiver circuit of claim 13, wherein the soft bit modification circuit is further configured to determine a confidence value for each of the modified soft bits by computing, for each modified soft bit, a magnitude equal to a weighted average of the magnitudes for the first soft bit, the second soft bit, and the re-encoded soft bit, wherein each re-encoded soft bit has a magnitude corresponding to a highest confidence level.

17. The receiver circuit of claim 16, wherein the magnitudes for the first soft bit, the second soft bit, and the re-encoded soft bit are weighted equally.

18. The receiver circuit of claim15, further comprising a decision circuit configured to:

combine each modified soft bit with the corresponding first soft bit, to obtain final soft bits; and decode the final soft bits to obtain final decoded bits.

19. The receiver circuit of claim 15, further comprising a decision circuit configured to:

combine each modified soft bit with the corresponding second soft bit, to obtain final soft bits; and decode the final soft bits to obtain final decoded bits.

20. The receiver circuit of claim 15, further comprising a decision circuit configured to decode the modified soft bits to obtain final decoded bits.

21. The receiver circuit of claim 13, wherein the encoded message comprises a Slow Associated Control Channel (SACCH) message or a Fast Associated Control Channel (FACCH) message transmitted in a wireless network.

22. The receiver circuit of claim 13, wherein the decoder circuit is further configured to:

determine that the first decoded bits include an error; and trigger the second transmission of the encoded message by sending a repetition request bit to the remote transmitter, via a modulator circuit and the radio frequency circuit.

23. The receiver circuit of claim 13, wherein the first and second transmissions of the encoded message have been subjected to the same encoding but the second transmission has been performed in reverse order from the first transmission, and wherein the soft bit modification circuit is further configured to reverse the order of the second soft bits before determining the sign values for the modified soft bits.

24. The receiver circuit of claim 13, wherein the second transmission of the encoded message has been modified with a pre-determined mask pattern, and wherein the soft bit modification circuit is further configured to alter the sign values for the second soft bits, according to the pre-determined mask pattern, before determining the sign values for the modified soft bits.

25. A receiver circuit adapted to decode an encoded message sent from a remote transmitter, the receiver circuit comprising:

receiving means for receiving first encoded bits corresponding to a first transmission of the encoded message and for receiving second encoded bits corresponding to a second transmission of the encoded message;

demodulator means for demodulating the first encoded bits to obtain first soft bits and for demodulating the second encoded bits to obtain second soft bits, each of the soft bits having a sign value and a magnitude;

decoder means for decoding the first soft bits to obtain first decoded bits;

re-encoder means for re-encoding the first decoded bits to obtain re-encoded bits, each of the re-encoded bits having either a positive or negative sign value; and soft bit modification means for determining sign values for modified soft bits corresponding to the encoded message, based on the sign values for the first soft bits, the sign values for the second soft bits, and the sign values for the re-encoded bits.

* * * * *

UNITED STATES PATENT AND TRADEMARK OFFICE
CERTIFICATE OF CORRECTION

PATENT NO. : 8,693,583 B2  
APPLICATION NO. : 13/297998  
DATED : April 8, 2014  
INVENTOR(S) : Das et al.

Page 1 of 1

It is certified that error appears in the above-identified patent and that said Letters Patent is hereby corrected as shown below:

On the Title Page, in the Figure, delete " 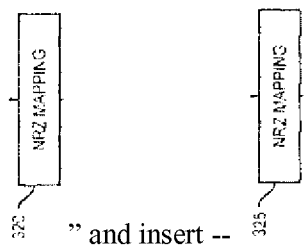 " and insert -- 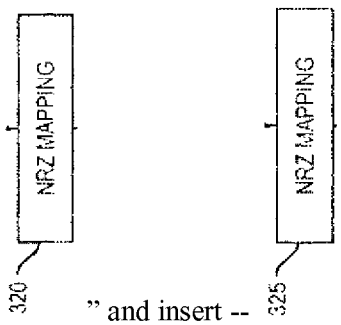 --, therefor.

On the Title Page, in the Figure, delete Tag "325" and insert Tag -- 330 --, therefor.

In the Drawings

In Fig. 3A, Sheet 3 of 9, delete " " and insert -- --, therefor.

In Fig. 3A, Sheet 3 of 9, delete Tag "325" and insert Tag -- 330 --, therefor.

In Fig. 3B, Sheet 4 of 9, delete " " and insert -- --, therefor.

In Fig. 3B, Sheet 4 of 9, delete Tag "325" and insert Tag -- 330 --, therefor.

Signed and Sealed this  
Twenty-second Day of July, 2014

Michelle K. Lee  
*Deputy Director of the United States Patent and Trademark Office*